June 29, 1937.　　　　B. JORGENSEN　　　　2,085,158

POWER DRIVING MECHANISM

Original Filed May 17, 1935　　2 Sheets-Sheet 1

Inventor
Bernhardt Jorgensen
By his attorney
Victor Cahl.

June 29, 1937.　　　　B. JORGENSEN　　　　2,085,158
POWER DRIVING MECHANISM
Original Filed May 17, 1935　　2 Sheets-Sheet 2

Inventor.
Bernhardt Jorgensen
By his attorney
Victor Cole

Patented June 29, 1937

2,085,158

UNITED STATES PATENT OFFICE 2,085,158

POWER DRIVING MECHANISM

Bernhardt Jorgensen, Marblehead, Mass., assignor to United Shoe Machinery Corporation, Paterson, N. J., a corporation of New Jersey Original application May 17, 1935, Serial No. 22,053. Divided and this application April 6, 1936, Serial No. 72,860

8 Claims. (Cl. 192—139)

This invention relates to power-driving mechanism, and more particularly to means whereby a power-driven rotable member is brought to a stop and is thereafter again automatically started, the present application being a division of my copending application for Letters Patent for improvements in Lasting machines, Serial No. 22,053, filed on May 17, 1935. As applied to the machine shown in that application controlling means constructed in accordance with the present invention brings the machine automatically to a stop prior to the completion of the cycle of operations, at a time when the lasting wipers are in pressure-applying relation to the margin of the upper, and after a predetermined interval starts the machine again in operation to cause it to complete its cycle. It is to be understood, however, that the invention is not limited in utility to machines of that character, but is applicable to various uses.

For the purposes in view the invention, in one aspect, provides a controlling member arranged to act on a clutch to bring to a stop a rotatable member driven by the clutch, and a periodically reciprocated device which thereafter moves the controlling member step by step in one direction to actuate the clutch and start the rotatable member again in operation after the controlling member has been moved a predetermined number of steps. The construction shown further comprises means for varying the extent of each of the periodic movements of the above-mentioned device to vary thereby the number of movements imparted to the controlling member before it actuates the clutch. In accordance with another feature the invention provides a device arranged to actuate the clutch to start the rotatable member and also to act on the clutch to bring the member to a stop at the end of a complete revolution thereof, and another device which acts on the clutch to bring the rotatable member to a stop after a partial revolution thereof and which thereafter acts automatically to start the member again in operation.

The above and other features of the invention, including various novel details of construction and combinations of parts, will now be more particularly described with reference to the accompanying drawings and thereafter pointed out in the claims.

Figure 4:
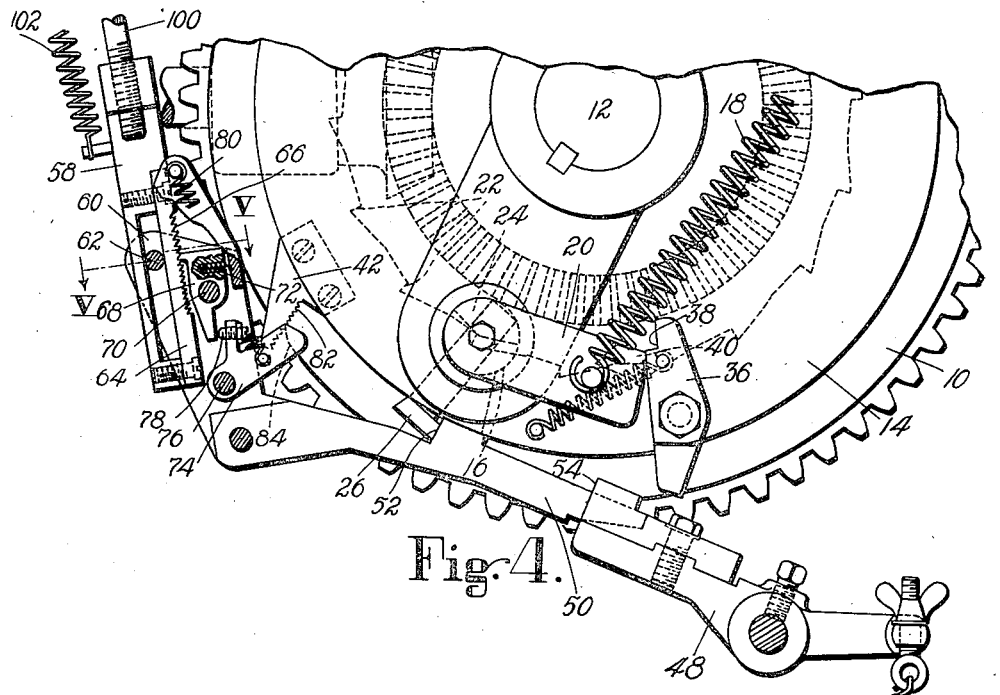
Fig. 4 is a view mainly in end elevation, on an enlarged scale, of parts which appear at the lower portion of Fig. 1, with the parts differently positioned than in Fig. 1.

Portions of the structure herein shown, comprising especially the mechanism for starting the machine and for automatically stopping it at the end of the cycle, are constructed substantially as disclosed in United States Letters Patent No. 1,843,232, granted on February 2, 1932 upon an application of mine, which may be consulted for a more complete understanding of details not hereinafter described. The machine is driven by an electric motor 2 connected by a chain 4 to a shaft 6 having thereon a worm 8 for driving continuously a worm gear 10 mounted to turn on a cam shaft 12. The gear 10 is constructed to serve as a clutch member cooperating with another clutch member 14 fast on the cam shaft 12. The two clutch members are connected together to drive the machine by the turning of a cylinrical member 16 (Fig. 4) in the member 14 by a spring 18 connected to an arm 20 fast on the outer end of the member 16. The inner end of the member 16 is recessed on one side to clear normally a series of teeth 22 carried by the gear 10, and when the member is turned by the spring 18 a portion 24 thereof is moved into the path of these teeth to cause the gear 10 to drive the member 14. The member 16 carries a pin 26 normally engaged by a plate 28 on a lever 30 to disconnect the clutch members 10 and 14 with the parts of the machine in starting positions. The lever 30 is lifted to release the pin 26 and start the machine through a hook 32 connected by a link 34 to manually operated means disclosed in the previously mentioned Letters Patent. When the arm 20 is operated by the spring 18 to connect the two clutch members, upon release of the pin 26 by the lever 30, it is locked against reverse movement by a spring-controlled lever 36 mounted on the clutch member 14 and having therein a notch 38 (Fig. 4) to receive a projection 40 on one side of the arm 20. After the starting of the machine the lever 30 is released from the hook 32, to permit the plate 28 to be returned into the path of movement of the pin 26, by a finger 42 fast on the clutch member 14 and arranged to engage the lower end of the hook. The lever 36 is engaged by a lug 44 on the plate 28 to release the arm 20 just before the pin 26 arrives in position to engage the end of the plate 28, after which this plate acts through the pin to disconnect the two clutch members and stop the machine at the end of the cycle of operations.

Figure 5:
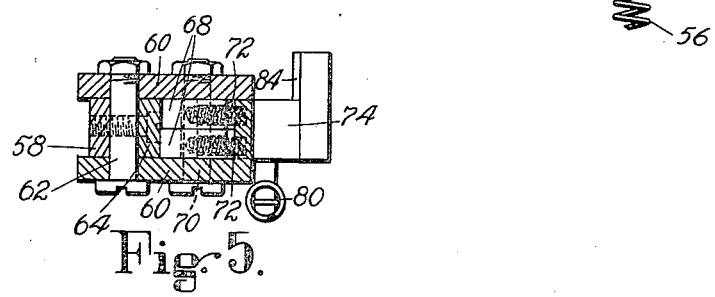
Fig. 5 is a section on the line V—V of Fig. 4.

The construction herein shown comprises additional means for bringing the machine to a stop between the beginning and the end of a cycle, for the purpose hereinbefore explained, and for again starting the machine automatically after a variably predetermined interval. For thus stopping the machine there is mounted on a bracket 46 on the base of the machine a lever 48 having fast thereon a controlling member or arm 50 provided with a shoulder 52 for engaging the pin 26 and disconnecting the two clutch members and provided also with a shoulder 54 for operating the lever 36 at the proper time to release the arm 20. The lever 48 is controlled by a spring 56 which holds the arm 50 normally against the periphery of the clutch member 14 with its shoulder 52 in the path of the pin 26. The arm 50 is swung downwardly to start the machine again by an automatic timing device including a bar 58 which is reciprocated periodically at all times in downward and upward directions by means hereinafter described. This bar is guided by two plates 60 (Fig. 5) which are secured to the arm 50 and by a bolt 62 mounted in the plates 60 and lying between a portion of the bar 58 and a plate 64 fast on the bar. Formed on this plate are ratchet teeth 66 engaged by two pawls 68 which are mounted to turn on a bolt 70 in the plates 60, the pawls being arranged in staggered relation for greater precision. Each pawl is controlled by a spring 72 which tends to hold it against the ratchet teeth. Normally, however, the pawls are held out of engagement with the ratchet teeth by a small bell-crank lever 74 mounted to turn on a pin 76 carried by the plates 60 and provided with screws 78 arranged to engage tails on the pawls to swing them away from the ratchet teeth against the resistance of their springs 72. The bell-crank lever 74 is held in position to disconnect the pawls from the ratchet teeth by a spring 80. Substantially at the time, however, when the arm 50 acts on the pin 26 to stop the machine the previously mentioned finger 42 on the clutch member 14 engages the bell-crank lever 74 and swings it far enough to release the pawls 68 and permit them to engage the ratchet teeth 66. Thereafter each downward movement of the bar 58 results in a corresponding downward movement of the arm 50 by reason of the fact that the ratchet teeth 66 tend to turn the pawls 68 in a counterclockwise direction (Fig. 4) and thus to cramp them against the plate 64. The arm 50 is locked against reverse upward movement by teeth 82 on the finger 42 in engagement with a tooth 84 on the bell-crank lever 74, the finger 42 thus serving as a detent. As the bar 58 receives each upward movement one or more of the teeth 66 are carried past the pawls 68 by reason of the fact that the pawls are turned by the teeth in a clockwise direction. It will thus be seen that the arm 50 is moved downward step by step until the shoulder 52 on the arm passes beyond the end of the pin 26, whereupon the machine is started again in operation. Just as the shoulder 52 passes beyond the end of the pin the bell-crank lever 74 also passes beyond the end of the finger 42, whereupon the spring 80 swings the bell-crank lever into position to disconnect the pawls from the ratchet teeth and the arm 50 is returned upward to its normal position by the spring 56.

Figure 1:
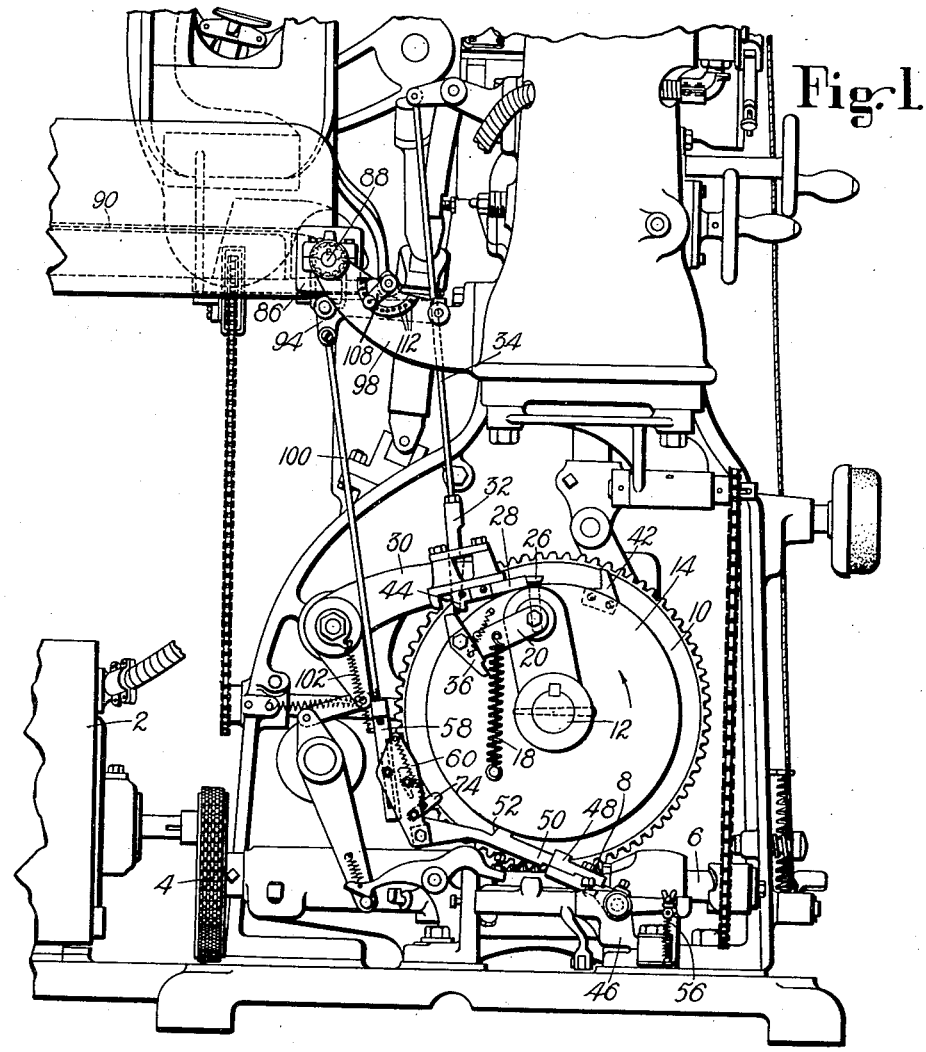
Fig. 1 is a view in left-hand end elevation of the lower portion of the machine shown in the above-mentioned copending application, showing mechanism in which the present invention is embodied.
Figure 2:
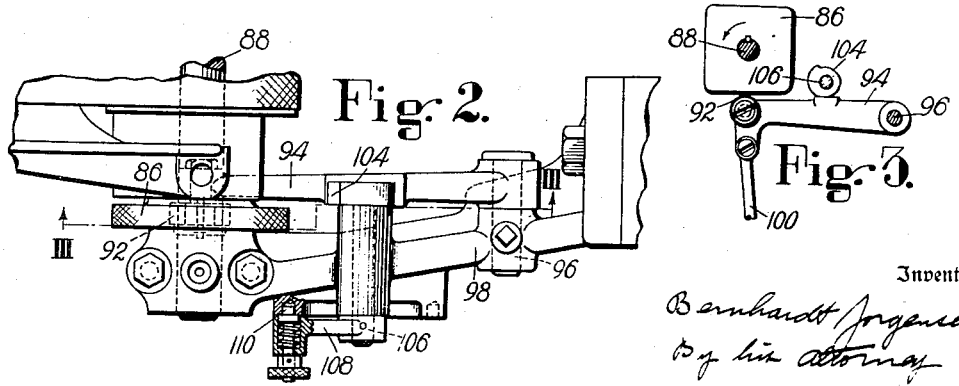
Fig. 2 is a plan view on an enlarged scale of a portion of the structure shown in Fig. 1.
Figure 3:
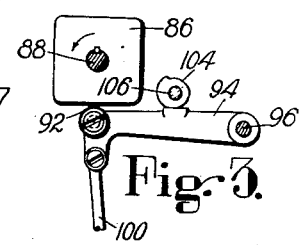
Fig. 3 is a section on the line III—III of Fig. 2, on a smaller scale.

For imparting to the bar 58 its repeated downward movements there is provided a cam member 86 (Figs. 1, 2 and 3) fast on a shaft 88 which is driven continuously and in the construction shown serves to operate a belt conveyor 90, as disclosed in the previously-mentioned Letters Patent. This cam member engages a roll 92 mounted on a lever 94 which is pivoted at 96 on a bracket 98 on the frame and is connected by a rod 100 to the bar 58. The cam member 86 is a substantially square member, as shown in Fig. 3, so that it imparts four downward movements to the lever 94 in each revolution of the shaft 88. After each downward movement, the bar 58 and the lever 94 are returned upwardly by a spring 102 connected to the bar. The limit of upward movement of the lever 94 is variably determined by a normally stationary cam 104 which engages the upper face of the lever and is fast on a shaft 106 mounted in the bracket 98, the shaft having also fast thereon a crank arm 108 for turning it and thereby adjusting the cam. The cam 104 is held in adjusted position by a spring-pressed pin 110 mounted in the arm 108 and arranged to enter one or another of a plurality of holes 112 (Fig. 1) in the bracket 98. It will thus be understood that by adjustment of the cam 104 the amount of downward movement imparted each time to the lever 94 and the bar 58 may be varied so as to vary the number of downward movements of the bar required to move the arm 50 downwardly far enough to start the machine. Accordingly the length of time that the machine remains at rest may be varied at will.

Having described the invention, what I claim as new and desire to secure by Letters Patent of the United States is:

1. In power-driving mechanism, the combination with a rotatable member, of a rotatable clutch for driving said member, a device arranged to actuate the clutch to start said member and also to act on the clutch to bring the member to a stop at the end of a revolution thereof, another device arranged to act on the clutch to bring the member to a stop after a partial revolution thereof, and automatic means for operating said other device to start the member again in operation.

2. In power-driving mechanism, the combination with a rotatable member, of a rotatable clutch for driving said member, a device arranged to actuate the clutch to start said member and also to act on the clutch to bring the member to a stop at the end of a revolution thereof, another device arranged to act on the clutch to bring the member to a stop after a partial revolution thereof, automatic mechanism for operating said other device to start the member again in operation, and means for varying the action of said automatic mechanism to vary the time that said member remains at rest.

3. In power-driving mechanism, the combination with a rotatable member, of a rotatable clutch for driving said member, a controlling member arranged to act on the clutch to bring said rotatable member to a stop, a periodically reciprocated device, and automatic means to cause said device to move the controlling member step by step in one direction as soon as said rotatable member comes to a stop and thereby to actuate the clutch to start said rotatable member again in operation after the controlling member has moved a predetermined number of steps.

4. In power-driving mechanism, the combination with a rotatable member, of a rotatable clutch for driving said member, a controlling member arranged to act on the clutch to bring said rotatable member to a stop, a periodically reciprocated device, and automatic means for connecting said device to the controlling member substantially at the time when the rotatable member comes to a stop to cause said device to move the controlling member step by step in one direction and thereby to actuate the clutch to start said rotatable member again in operation after the controlling member has moved a predetermined number of steps.

5. In power-driving mechanism, the combination with a rotatable member, of a rotatable clutch for driving said member, a controlling member arranged to act on the clutch to bring said rotatable member to a stop, a periodically reciprocated device, automatic means to cause said device to move the controlling member step by step in one direction and thereby to actuate the clutch to start said rotatable member again in operation after the controlling member has moved a predetermined number of steps, and a detent movable with said rotatable member into position to hold said controlling member against retractive movement after each movement imparted thereto by said device.

6. In power-driving mechanism, the combination with a rotatable member, of a rotatable clutch for driving said member, a controlling member arranged to act on the clutch to bring said rotatable member to a stop, a periodically reciprocated device, automatic means to cause said device to move the controlling member step by step in one direction and thereby to actuate the clutch to start said rotatable member again in operation after the controlling member has moved a predetermined number of steps, and means for varying the extent of the periodic movements of said device to vary the number of movements imparted to the controlling member before it actuates the clutch.

7. In power-driving mechanism, the combination with a rotatable member, of a rotatable clutch for driving said member, a pin carried by the clutch, a lever arm having a shoulder in the path of said pin to act on the clutch through the pin and thereby bring said rotatable member to a stop, a periodically reciprocated device, and mechanism arranged to be actuated substantially at the time when said rotatable member comes to a stop to connect said device to the lever arm for moving the arm step by step in one direction and for thus actuating the clutch to start said rotatable member again in operation after the arm has moved a predetermined number of steps.

8. In power-driving mechanism, the combination with a rotatable member, of a rotatable clutch for driving said member, a pin carried by the clutch, a lever arm having a shoulder in the path of said pin to act on the clutch through the pin and thereby bring said rotatable member to a stop, a periodically reciprocated device, mechanism for connecting said device to the lever arm and for disconnecting it therefrom, and a finger movable with said rotatable member into position to cause said mechanism to connect the device to the arm for moving the arm step by step and for thus actuating the clutch to start said rotatable member again in operation after the arm has moved a predetermined number of steps, said finger being constructed to serve also as a detent to hold the arm against retractive movement after each movement imparted thereto by said device.

BERNHARDT JORGENSEN.